(12) United States Patent
Ali

(10) Patent No.: US 7,297,281 B2
(45) Date of Patent: Nov. 20, 2007

(54) SYSTEMS HAVING NANOSTRUCTURED ADSORPTION MATERIAL AND METHODS FOR PURIFICATION OF FLUID

(75) Inventor: Aslam Mohamed Ali, Cupertino, CA (US)

(73) Assignee: Yakima Filters, Inc., Cupertino, CA (US)

( * ) Notice: Subject to any disclaimer, the term of this patent is extended or adjusted under 35 U.S.C. 154(b) by 86 days.

(21) Appl. No.: 10/947,988

(22) Filed: Sep. 23, 2004

(65) Prior Publication Data

US 2006/0060530 A1 Mar. 23, 2006

(51) Int. Cl.
- B01D 61/00 (2006.01)
- B01D 39/00 (2006.01)
- B01D 35/00 (2006.01)
- C02F 9/00 (2006.01)
- C02F 37/00 (2006.01)
- C02F 1/00 (2006.01)

(52) U.S. Cl. .................. 210/757; 210/282; 210/501; 210/502.1; 210/85

(58) Field of Classification Search ............ 210/502.1, 210/500.27, 257.2, 455, 464, 473, 244, 484, 210/767, 650, 282, 501, 85, 149
See application file for complete search history.

(56) References Cited

U.S. PATENT DOCUMENTS

| | | | |
|---|---|---|---|
| 703,654 A | 7/1902 | Hall | |
| 2,781,312 A | 2/1957 | Klumb et al. | |
| 3,872,012 A * | 3/1975 | Endicott | 210/297 |
| 3,872,013 A * | 3/1975 | Nishino et al. | 210/317 |
| 3,954,545 A * | 5/1976 | Hamisch et al. | 156/384 |
| 4,714,550 A | 12/1987 | Malson et al. | |
| 4,800,018 A | 1/1989 | Moser | |
| 5,006,267 A * | 4/1991 | Vaughn et al. | 210/755 |
| 5,071,551 A * | 12/1991 | Muramatsu et al. | 210/266 |
| 5,102,547 A * | 4/1992 | Waite et al. | 210/501 |
| 5,122,272 A | 6/1992 | Iana et al. | |
| 5,149,437 A | 9/1992 | Wilkinson et al. | |
| 5,186,830 A | 2/1993 | Rait | |
| 5,342,528 A * | 8/1994 | Adachi et al. | 210/668 |
| 5,431,813 A | 7/1995 | Daniels | |
| 5,562,824 A | 10/1996 | Magnusson | |
| 5,594,070 A * | 1/1997 | Jacoby et al. | 525/88 |
| 5,609,759 A | 3/1997 | Nohren, Jr. et al. | |
| 5,709,870 A * | 1/1998 | Yoshimura et al. | 424/404 |
| 5,733,448 A | 3/1998 | Kaura | |
| 5,830,360 A | 11/1998 | Mozayeni | |
| 5,869,013 A * | 2/1999 | Tabata et al. | 423/239.2 |
| 6,117,332 A | 9/2000 | Hatch et al. | |
| 6,136,189 A * | 10/2000 | Smith et al. | 210/266 |
| 6,344,146 B1 | 2/2002 | Moorehead et al. | |
| 8,593,271 | 7/2003 | Hayden | |

(Continued)

Primary Examiner—Ana Fortuna
(74) Attorney, Agent, or Firm—Chinh H. Pham; Greenberg Traurig, LLP

(57) ABSTRACT

A system for removing particulates and/or contaminants, including impure compounds and elements from fluid to be treated is provided. The systems can include a receptacle having chamber in which a volume of fluid may be accommodated, a cover for placement across an opening into the chamber, so as to prevent fluid from within the chamber from spilling, and a porous matrix, positioned within the chamber and having a nanostructured adsorption material for trapping and retaining, within its pores, particles and contaminants in the fluid. A method for removing particulates and contaminants is also provided.

19 Claims, 7 Drawing Sheets

A replaceable nanostructured adsorption material shown with a bottle

U.S. PATENT DOCUMENTS

| | | |
|---|---|---|
| 6,602,406 B1 * | 8/2003 | Nohren et al. ............... 210/136 |
| 6,652,751 B1 * | 11/2003 | Kutowy et al. ......... 210/500.27 |
| 6,653,878 B2 * | 11/2003 | Nolan ........................ 327/170 |
| 6,682,667 B1 | 1/2004 | Matviya |
| 6,696,030 B1 | 2/2004 | Hayden |
| 6,733,669 B1 | 5/2004 | Crick |
| 6,986,429 B2 * | 1/2006 | Naji et al. ................... 210/501 |
| 6,989,101 B2 * | 1/2006 | Cumberland et al. ....... 210/660 |

\* cited by examiner

SYSTEMS HAVING NANOSTRUCTURED ADSORPTION MATERIAL AND METHODS FOR PURIFICATION OF FLUID

FIELD OF THE INVENTION

The present invention relates to removal of particulates and/or contaminants, including impure compounds and elements, from fluid, and more specifically, to containers having a nanostructured adsorption material for removing such particulates and/or contaminants.

RELATED ART

In many instances, fluid, such as water, fit for consumption may not be available. For example, during an extended trip away from a concentrated community, the fluid available, such as that in a pond, may contain levels of particulates and/or contaminants exceeding the prescribed limits that is intended for human consumption. Currently, there are various known processes and methods for removal of particulates, including impure compounds and elements, and/or contaminants from fluid.

U.S. Pat. No. 703,654 discloses a canteen having two separate chambers enclosed within the canteen for filtered and unfiltered water. A filtering media is placed between the two chambers and an air-pump is connected to the chamber for unfiltered water. The air-pump is used to force unfiltered water through the filtering media into the chamber for filtered water.

U.S. Pat. No. 2,781,312 discloses a receptacle for receiving a supply of water having an access opening. A loose mass of treating material is provided within the receptacle so that it can be freely dispersed within the water to treat water having chemical content, along with a filter for filtering the treated water of undesirable constituents. Water is forced through the filter for filtration purposes. A dye is provided on the treating material to impart color to the water to indicate the state of exhaustion of the treating material is partially or wholly exhausted and thereby signal the operator when the quality of the treated water is below a specified standard.

U.S. Pat. No. 4,714,550 discloses a water purifying system that includes an elongate chambered purifying assembly that is sized to be detachable mounted in a conventional canteen. The assembly is provided with an internal chamber filled with a particulate water purifying material. Concentric tubes within the chamber allow water flowing into the chamber through a filtered inlet at the bottom of the assembly to follow an extended chambered flow path through the purifying material to an outlet at the top of the assembly.

The U.S. Pat. No. 4,800,018 discloses a simplified portable water purification system that provides an unfiltered water receiving compartment, a disposable filter cartridge, and a filtered water reservoir all in a single container. The disposable filter cartridge is horizontally positioned centrally and divides the container into the two compartments. Contaminated and unfiltered water is poured into the top receiving compartment of the container and is allowed to pass through filtering materials in the disposable filter cartridge into the reservoir below.

The U.S. Pat. No. 5,122,272 discloses a container assembly having a removable filter device extending into the container through an opening at the top. The filter device, comprising an elongated cylindrical member, is constructed so as to provide an upper chamber and a lower chamber. The upper chamber serves as a passageway for air entering the container while the lower chamber includes a water filter for water exiting the container. In using the container, water disposed in the container is extracted through the filter by suction and is replaced by air entering the container through the upper chamber.

The U.S. Pat. No. 5,149,437 discloses a device that includes a filter housing having an inlet at one end for water to be purified and an outlet for purified water at an opposing end. The filter device including in sequence first, second and third layers of purification material. The first layer of purification material includes metallic particles for establishing a suitable redox potential in the first layer. The second layer of purification material includes activated carbon. The third layer of purification material includes a weak acid ion exchange resin.

The U.S. Pat. No. 5,186,830 discloses an apparatus filtering drinking water which includes a lower non-porous container to receive the filtrate. An upper vessel closed at its lower end by a high density ceramic filter is stacked in nested relationship to the lower container. When water containing contaminants and pollutants is poured into the filter vessel, it drips through the ceramic filter under gravitational forces and is stored in the lower receptacle.

The U.S. Pat. No. 5,431,813 discloses a bottle that includes a water filtering apparatus incorporated within the neck of the bottle. During normal consumption of the water from the water filtering bottle, water is filtered by the filtering apparatus to remove unwanted substances such as pesticides, chlorine, particulate matter, algae, bacteria, heavy metals, and improves odor and flavor of the consumable water.

The U.S. Pat. No. 5,562,824 discloses a gravity percolation water purifier assembly. The assembly includes a covered storage container having a dispensing spigot. A flanged filtration chamber is supported beneath the cover to receive untreated water. A porous filter cartridge is sealed to an outlet port. A purifier cartridge is threaded to the outlet port and supports multiple fibrous spacers and treatment chambers containing beds of treatment media, including a multivalent iodine media, granular activated carbon, and a halogen scavenger media. In one purification cartridge, water passes from multiple inlet ports at an inlet bore through adjoining centric chambers and to the storage container via outlet ports at the periphery of the purifier cartridge.

The U.S. Pat. No. 5,609,759 discloses a filter assembly for use with a plastic bottle having an open neck. The assembly includes a tube of filtering material connected to one surface of a cap with a valve extending from an opposite surface of the cap. The tube includes a filtering material, such as activated carbon with plastic binder, having a substantially continuous liquid-porous sidewall, a hollow interior, a first closed end, and a second open end. The tube is operatively connected to the cap second surface at the tube second open end. A biocidal medium may be disposed within the hollow interior of the filter tube, and the tube may be wrapped with a filter material. The filtering material is capable of reducing the level of chlorine and water passing through it by at least 50% at a flow rate of about 5 ml/second.

The U.S. Pat. No. 5,733,448 discloses a container having two chambers separated by a filter. One of the chambers is capable of being compressed so as to pressurize a volume of water to be filtered in the chamber. Upon applying pressure, the water is forced through the filter into the second chamber where it is stored for use in a clean and drinkable form. The filter includes a series of discs arranged to effectively remove particulate, chemical and other undesired contents of the water. The filtered water may be filtered to the molecular level providing an essentially sterile drinking water.

The U.S. Pat. No. 5,830,360 discloses a gravity-fed, pour-through water filtration device that includes a chamber for housing a spiral filter. The devices also includes a biocidal material and an annular holding chamber. Several porous separator disks, a volume of filtration media, and a cyst membrane can be positioned beneath the spiral filter and holding chamber. The device is designed to reduce the number of bacteria, viruses and cysts present in the filtrated water.

The U.S. Pat. No. 6,117,332 discloses a feeder insert for a tubular water filtration cartridge utilized in household point of use water filtration systems. The feeder insert allows a chemical to be fed into a incoming water supply at a controlled rate by employing a bypass system that allows a predetermined amount of incoming water to flow past the feed chemical without contacting the chemical. The amount of water in the bypass flow can also be manually adjusted through the use of two adjustment mechanisms, an adjustable ring and a rotatable end cap, located on the feeder insert.

The U.S. Pat. No. 6,344,146 discloses an integrated water purification device which includes a receptacle modified to accommodate a filtration assembly for purifying water, and to store water following purification. The receptacle provides separate openings for water intake, and water outflow. The filtration assembly includes a pump and a multistage filter cartridge. Pump action draws water into the water purification device and forces the water though the multistage filter and into the receptacle. Purified water may be stored in the receptacle until consumption.

The U.S. Pat. No. 6,733,669 discloses a water purification system having a watertight polymeric container having an upper unfiltered water receiving chamber and a lower filtered water chamber. A disposable filter cartridge is provided between the chambers. This allows for gravity induced filtering through cartridge as opposed to pressure induced filtering.

The above referenced systems are designed to filter water by way of a flow-through process utilizing either gravity or pressure. In addition, with these systems, a mechanism is not readily available to determine the level of particulates removed by the filter, as well as whether the filter can still remove particulates. Accordingly, it is desirable provide a system for removing particulate from water that not only can display the level of contaminants removed, but whether contaminants can still be removed by a particulate removal mechanism.

SUMMARY OF THE INVENTION

The invention described herein relates to a system designed for purification of fluid for consumption by removing contaminants, such as microorganisms, organic, inorganic, and particulate matters from the fluid. In one embodiment of the present invention, the system includes a receptacle having a chamber into which a volume of fluid may be placed. The system may also include a porous matrix placed within the chamber for entrapment of the particulates and/or contaminants upon surface contact between the fluid and the porous matrix. In one embodiment, the porous matrix includes a nanostructured adsorption material and may be embedded on the interior surface of the receptacle. Alternatively, the porous matrix may be placed onto the interior surface of the receptacle as a thin film, coating, layer or as a sheet of material. In another embodiment, the porous matrix may be a loose mass of macro particles that can freely move within the fluid in the receptacle. The nanostructured adsorption material, in one embodiment, may be contain different chemical materials, including silver or silver compounds. The system may further include a sensor in communication with the porous matrix, so as to detect levels of particulates and/or contaminants adsorbed on the matrix or quantity of particulates and/or contaminants removed from the fluid to be treated.

The present invention also provides a method for purification of fluid by removing unwanted particulates and/or contaminants from a fluid. In one embodiment, a receptacle having a chamber for accommodating a fluid to be treated may be provided. A porous matrix having nanoscaled pores may thereafter be placed within the chamber. The fluid to be treated may next be introduced into the chamber. Next, movement of the fluid within the receptacle may be initiated. Upon surface contact between the fluid and the porous matrix, the particulates and/or contaminants may be directed within the porous matrix and trapped therein. If there is no movement of drinking water within the portable containers or bottles, the contaminants may still removed by slow molecular displacement or diffusion into the porous matrix. In an embodiment, levels of contaminants removed from the fluid may be indicated, as well as whether the ability of the porous matrix to remove additional contaminants has been exhausted.

BRIEF DESCRIPTION OF THE DRAWINGS

The invention is explained in greater detail below with reference to an exemplary embodiment that is illustrated in the accompanying figures.

DETAILED DESCRIPTION OF SPECIFIC EMBODIMENTS

The present invention provides, in one embodiment, a system purification of fluid for consumption by removing particulates, such as impure and undesirable constituents, contaminants, such as microorganisms, biological contaminants, organic and inorganic compounds and elements, and/or matters or substances ranging from about 1 nanometer (nm) to about 100 nm or larger from the fluid, for instance water, so that the resulting treated or purified fluid will be safe to consume, i.e., the fluid has levels of contaminants not exceed the prescribed limits intended for human consumption.

Figure 1:
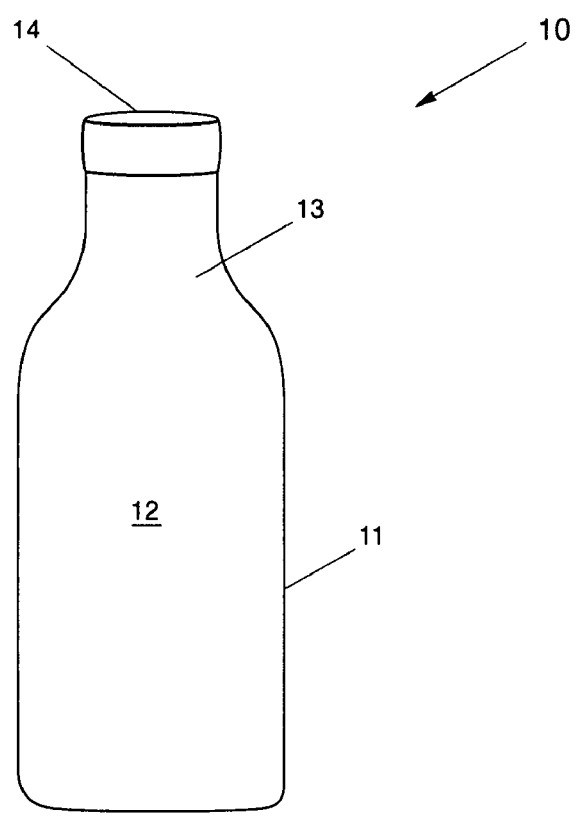
FIG. 1 illustrates a longitudinal section view of a system for removing contaminants from fluid in accordance with one embodiment of the present invention.

In FIG. 1, there is shown a system 10 having a receptacle 11, for example, a bottle, a container, or the like, into which a volume of fluid to be treated or purified may be placed. The receptacle 11, in one embodiment, may include a chamber 12 for accommodating a volume of fluid, and an opening 13 through which a volume of fluid may be introduced into the chamber 12. A cover 14 may be provided across the opening 13 to prevent spillage of fluid from within the chamber 12. The cover 14, in one embodiment, may be a snap-on cover, a threaded cover, or any other cover known in the art, so long as it can operate to prevent fluid from spilling from within the chamber 12. Although illustrated as a portable container, the receptacle 11 may be larger in scale and can be of any size, depending on the application of interest. In addition, the receptacle 11 may be made from a transparent material to permit viewing of the fluid content therein.

Figure 2A:
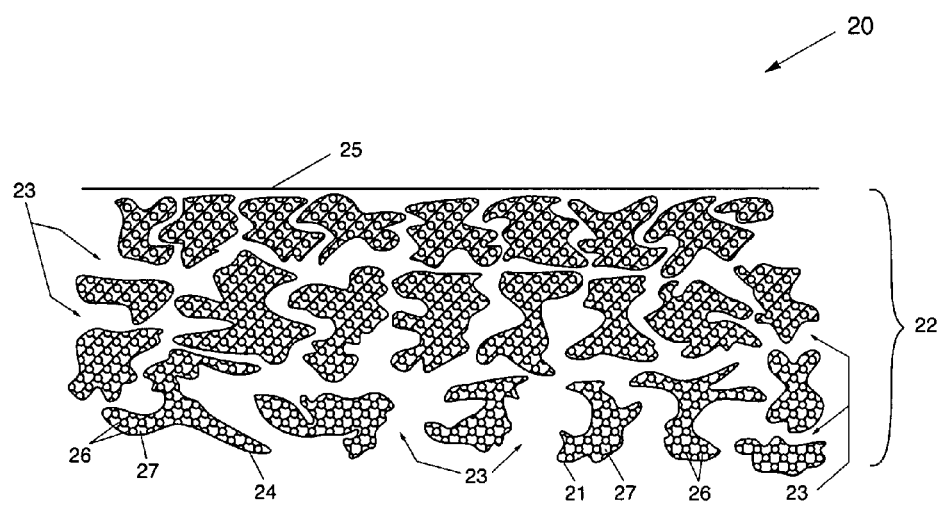
FIGS. 2A-B illustrate a cross section view of various porous matrices for use in connection with the present invention.
Figure 2B:
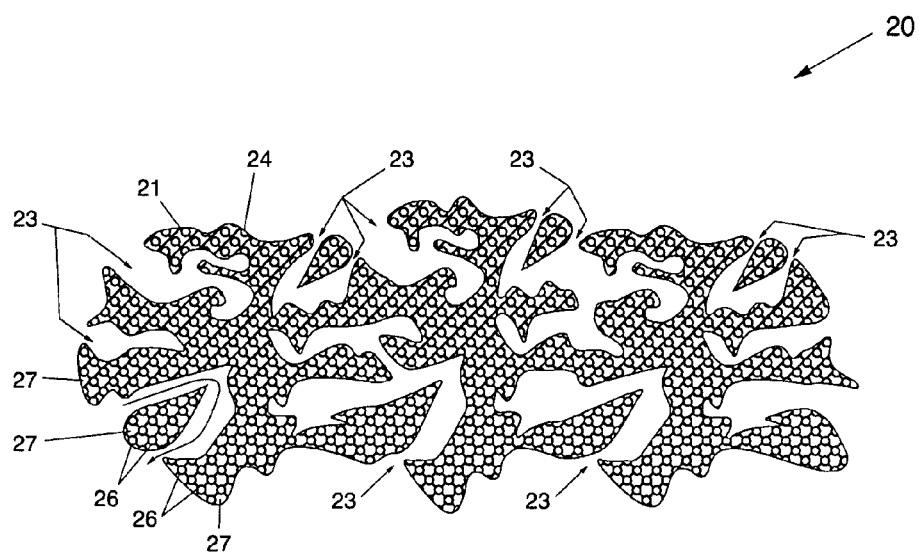

The system 10 may also include a porous matrix, such as that illustrated in FIGS. 2A and 2B, positioned within the chamber 12 for the removal of particulates and/or contaminants from the fluid within chamber 12. In accordance with one embodiment of the present invention, porous matrix 20 may include a nanostructured adsorption material 21 having a large volume of pores 23. In addition, the porous matrix 20 may be provided with a fluid contact surface 24 against or across which fluid within the chamber 12 may flow, and a substantially fluid impermeable surface 25 across which fluid within the porous matrix 20 and chamber 12 cannot pass. Pores 23, in one embodiment, may be nanoscale in size, ranging from about 1 nanometer (nm) to about 100 nm. In this manner, particles and/or contaminants ranging from about 1 nm to about 10 nm or larger can be removed from the fluid. The pores 23 may include a total volume ranging from about 0.5 $cm^3/g$ to about 1.0 $cm^3/g$. In a preferred embodiment, the total volume of pores 23 may range from about 0.8 $cm^3/g$ to about 0.95 $cm^3/g$, with a total specific surface area ranging from at least approximately 1000 $m^2/g$ to approximately 3000 $m^2/g$, and higher.

As illustrated in FIG. 2A, the nanostructured adsorption material 21 may include, in one embodiment, a plurality of layers 22, each having pores 23 within a predetermined size range. In such an embodiment, layers 22 may be arranged so that the pores 23 in each successive layer 22 get successively smaller in size, moving from the layer immediately adjacent the contact surface 24 to the layer immediately adjacent the substantially impermeable surface 25. In this manner, smaller particulates and/or contaminants may be permitted to move through the larger pores adjacent the contact surface 24 and into the smaller pores adjacent the substantially impermeable surface 25 where they can be trapped and retained.

Alternatively, as illustrated in FIG. 2B, the nanostructured adsorption material 21 may be designed without distinctive layers 22, such that pores 23 of various nanoscale size ranges may be interspersed throughout the entire nanostructured adsorption material 21. Although not illustrated, it should be appreciated that the nanostructured adsorption material 21 may be provided with a plurality of layers as shown in FIG. 2A, while each layer may include pores 23 of various nanoscale size ranges interspersed therein, similar to those in FIG. 2B.

The porous matrix 20 used in connection with the system 10 of the present invention may, in one embodiment, be formed from, for instance, porous char generated from various starting materials, for example, discarded or used automobile tires or other materials that can generate a relatively high fixed carbon content within the porous char. Of course, new automobile tires or similar starting materials may also be used to generated the porous char. In one embodiment, the starting materials may be heated in a reactor, within which the environment may be controlled, initially from room temperature to about 250° C. to 300° C. During this initial heating period, a mixture of condensable and non-condensable gases may be given off from the starting material within the reactor. This mixture of gases, which can be captured for reintroduction at a later stage, can typically include approximately 25%-35% carbon dioxide, approximately 10%-15% carbon monoxide, approximately 5%-10% methane, approximately 1%-5% volatile acids, with the remaining portion containing a mixture of hydrogen, oxygen, hydrocarbons, i.e., organic materials.

Upon the reaching between 250° C. to 300° C., an exothermic reaction can occur within the reactor pushing the temperature of the reactor and thus the resulting porous char to temperatures ranging from about 500° C. to about 600° C. During this period, the previously captured condensable and non-condensable gases may be reintroduced into the reactor for exposure to the porous char. The resulting porous char may contain, at this stage, mostly macro-pores and may only be moderately dense in nature. To subsequently obtain a nanostructured adsorption material, this moderately dense porous char must be transformed to a relatively high-density material with a relatively high fixed carbon content.

To generate a relatively high fixed carbon content in the porous char, impurities present in the starting materials, and in the transformed material, i.e., porous char, may be removed, using known procedures, at various stages during the conversion process to produce a fixed carbon content in the porous char of greater than about 90% to about 95%. It should be noted that, on average, approximately 20 pounds of starting material, e.g., used tires, will yield about 4 pounds of porous char with a fixed carbon content of between 90% to 95%. Once the condensable and non-condensable gases have been reintroduced into the reactor, the temperature within the reactor may be increased so that the porous char may be heated at a relatively high temperature range of from about 1000° C. to about 1100° C. to enlarge the pores within the porous char. During this stage, a controlled mixture of steam and air may be introduced into the reactor. In one embodiment, for approximately 1 pound of porous char, from about 1.0 pound to about 1.5 pounds of steam and air mixture may be injected into the reactor. The amount of steam and air may vary depending upon how much the pores within the porous char are to be enlarged, and could vary from about 0.5 pounds to over 2.0 pounds per pound of porous char. The introduction of steam and air into the reactor, in one embodiment, can generate a producer gas in the presence of the hot porous char. The content of the producer gas may vary, but can contain about 15%-20% hydrogen, 20%-25% carbon monoxide, with the remainder a mixture of nitrogen, hydrocarbons and other organic materials.

By exposing the porous char to such a temperature range and a mixture of steam and air, the porous char may be transformed into a relatively high density nanostructured material having the desired porosity. Typically, approximately 1 pound of the high density nanostructured material can be generated from the 4 pounds of the porous char. The exposure of the porous char to such high temperature, in addition to enlarging and generating pores of various nanoscale sizes, can provide the resulting nanostructured adsorption material with internal surface areas ranging from at least approximately 1000 m$^2$/g to approximately 3000 m$^2$/g, and higher.

The resulting nanostructured material, similar to nanostructured adsorption material 21 shown in FIGS. 2A-B, may be used in connection with the porous matrix 20 of the present invention. It should be noted that the process of enlarging the pores structure to specific nanoscale ranges, along with the removal of impurities within the porous char can impart special properties to the nanostructured material. In particular, such a process can impart the nanostructured material with adsorption properties necessary for removal of particulates and contaminants.

In addition to the size of the nanoscale pores, the ability of nanostructured material to adsorb particulates and contaminant molecules can also be dependent upon the structure of the nanoscale pores, the total surface area, the carbon particle size, and the void space between carbon particles. Specifically, as the nanostructured adsorption material, such as item 21 in FIGS. 2A and 2B, essentially comprises nanocarbon particles 26, the spaces 27 between these nanocarbon particles must be sufficiently small, i.e., nanoscale in size and smaller than the molecules of the fluid, so as to facilitate the fluid going through the pores 23 within the nanoadsorption material 21 and not through spaces around the pores 23. Likewise, should the carbon particles be larger than nanoscale size, such large carbon particles may block, partially block, and/or create interference with the flow of the fluid into the pores 23, thus allowing fluid to flow away from the pores 23. As a result, particulates and/or contaminants within the fluid flow may escape entrapment within the pores 23.

It should be appreciated that since one surface 25 of the porous matrix 20 is substantially impermeable to fluid, the porous matrix 20 of the present invention does not have flow-through properties similar to commercially available filters. Rather, fluid flowing against or across the contact surface 24 will enter and exit along the contact surface 24. Specifically, fluid flowing against or across the contact surface 24 into the nanostructured adsorption material 21 cannot thereafter exit through surface 25. In the presence of the impermeable surface 25, the fluid directed into one opening of a pore 23 adjacent the impermeable surface 25 may subsequently be allowed to flow out another opening of pore 23 not blocked by the impermeable surface 25, as illustrated by the arrows in FIGS. 2A and 2B, and eventually make its way out through the contact surface 24. Impermeable surface 25, in one embodiment of the present invention, may be generated by applying a layer of a substantially fluid impermeable material to one surface of the porous matrix 20.

The porous matrix 20 may further, in accordance with an embodiment of the present invention, be impregnated with, for instance, silver or silver compound(s) so as to minimize microbial growth within the porous matrix 20. In particular, the nanostructured adsorption material 21 may be treated with a silver compound in the presence of acid or alkaline materials, depending on the silver compound used, so that the silver compound can be substantially evenly distributed against internal surfaces of pores 23. Since this process can generate undesirable materials during the chemical reactions, such materials can be removed, in one embodiment, by leaching. The process employed herein can enhance the properties of the porous matrix 20. In addition to removal of particulates and contaminants, the presence of the silver compound, as noted, can minimize microbial growth within the porous matrix 20. Furthermore, it should be noted that the silver content provided within the porous matrix 20 using the process described herein may be at a level far below the permissible limits of silver in drinking water. In an embodiment, the silver content may be approximately 1 percent by weight. Additionally, the process employed herein can minimize the leaching of the silver content from within the porous matrix 20. In this manner, the presence of the silver compound within the porous matrix 20 does not act to elevate the level of silver above permissible limits.

Figures 3A, 3B:
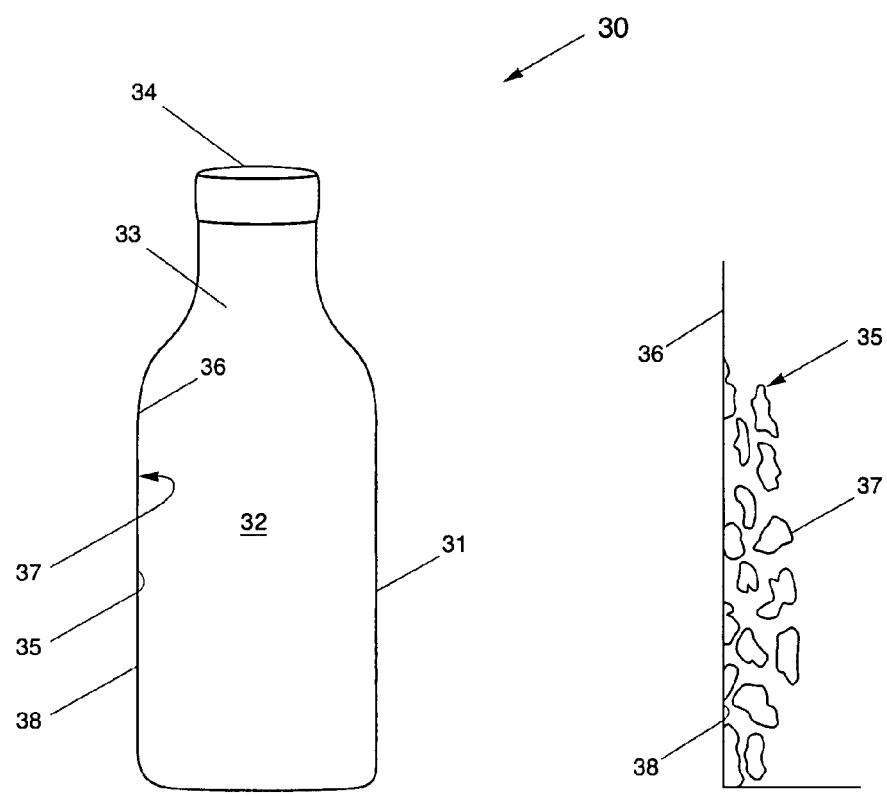
FIG. 3A illustrates a longitudinal section view of a system for removing contaminants from fluid in accordance with another embodiment of the present invention.
FIG. 3B illustrates a sectional view of a porous matrix for use in connection with the system in FIG. 3A.

With reference now to FIGS. 3A-B, there is illustrated a system 30 for purification of fluid by removing contaminants, such as microorganisms, organic, inorganic and particulate matter from the fluid. The system 30, in one embodiment, may include a receptacle 31, similar to that of system 10 shown in FIG. 1. The receptacle 31 may include a chamber 32 for accommodating a volume of fluid, and an opening 33 through which a volume of fluid may be introduced into the chamber 32. A cover 34 may be provided across the opening 33 to prevent spillage of fluid from within the chamber 32.

The system 30 may also include a porous matrix 35 positioned within the chamber 32 for the removal of contaminants from the fluid. The porous matrix 35, in accordance with one embodiment of the present invention, may be substantially similar to the porous matrix 20 of FIGS. 2A-B, and may be used to retain or trap particulates and/or contaminants in the fluid. The porous matrix 35, as shown in FIG. 3B, and used in connection with system 30, may be embedded within chamber walls 36, so that contact surface 37 may be exposed to the fluid within the chamber 32, while substantially impermeable surface 38 may be positioned against chamber walls 36. In one embodiment, the porous matrix 35 may be embedded substantially circumferentially about chamber walls 36. Although illustrated as extending partially up walls 36, should it be desired, porous matrix 35 may be permitted to extend substantially along the length of walls 36. To embed the porous matrix 35 within the walls 36, means known in the art may be employed, for instance, co-extrusion of the porous matrix 35 along with the material comprising receptacle 31. In one embodiment of the present invention, porous matrix 35 may be provided with a thickness ranging from about 0.20 mm to about 0.30 mm.

In an alternate embodiment, instead of being embedded within the walls 36 of the chamber 32, the porous matrix 35, made from a nanostructured adsorption material, may be applied directly onto the walls 36. In one embodiment, the porous matrix may be coated onto walls 36 as a thin film or layer. Alternatively, the porous matrix 35 may be designed as a sheet of material that can be adhered to the walls 36 of chamber 32. Regardless of the adherence material used, such material should be one that is non degradable in the presence of fluid. In either embodiment, the thin film or sheet of porous matrix 35 may be designed so that it is sufficiently flexible and pliable for removal or insertion across opening 33.

Figure 4A:
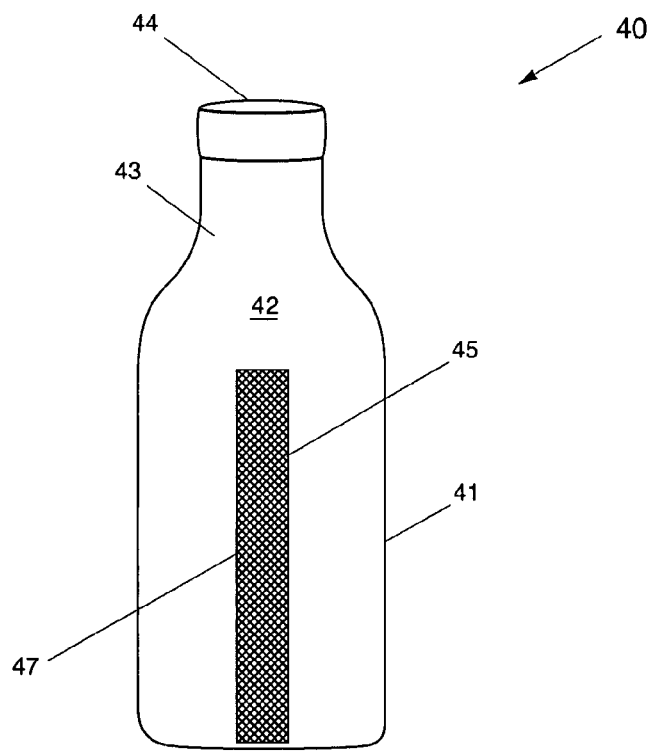
FIG. 4A illustrates a longitudinal section view of a system for removing contaminants from fluid in accordance with still another embodiment of the present invention.
Figure 4B:
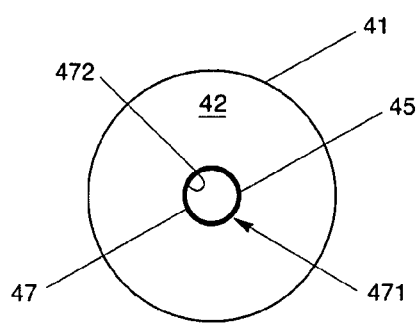
FIG. 4B illustrates a cross sectional view of the receptacle shown in FIG. 4A.

Looking now to FIGS. 4A and 4B, there is illustrated a system 40 for purification of fluid by removing contaminants, such as microorganisms, organic, inorganic and particulate matter from the fluid, similar to the systems disclosed above. The system 40, in one embodiment, may include a receptacle 41 having a chamber 42 for accommodating a volume of fluid, and an opening 43 through which a volume of fluid may be introduced into the chamber 42. A cover 44 may be provided across the opening 43 to prevent spillage of fluid from within the chamber 42.

The system 40 may also include a porous matrix 45 positioned within the chamber 42 for the removal of contaminants from the fluid. The porous matrix 45, being substantially similarly to the previous porous matrices, acts to retain or trap therein contaminants from the fluid. As illustrated in FIGS. 4A and 4B, the porous matrix 45, made from a nanostructured adsorption material, may be designed as a substantially cylindrical tube 47 having a contact surface 471, and an opposing impermeable surface 472. The porous matrix 45, as shown in FIG. 4A, may be positioned away from walls 46 of chamber 42. In one embodiment, as illustrated from the perspective of FIG. 4B, porous matrix 45 may be positioned substantially concentrically to the walls 46, and may be designed to have a diameter that permits its removal from or placement within the chamber 42 through opening 43. In order to maintain porous matrix 45 substantially concentric to the walls 46, a base (not shown) may be provided within which porous matrix 45 may be positioned. Alternatively, porous matrix 45 may be permitted to float freely within the chamber 42.

Figures 5, 6:
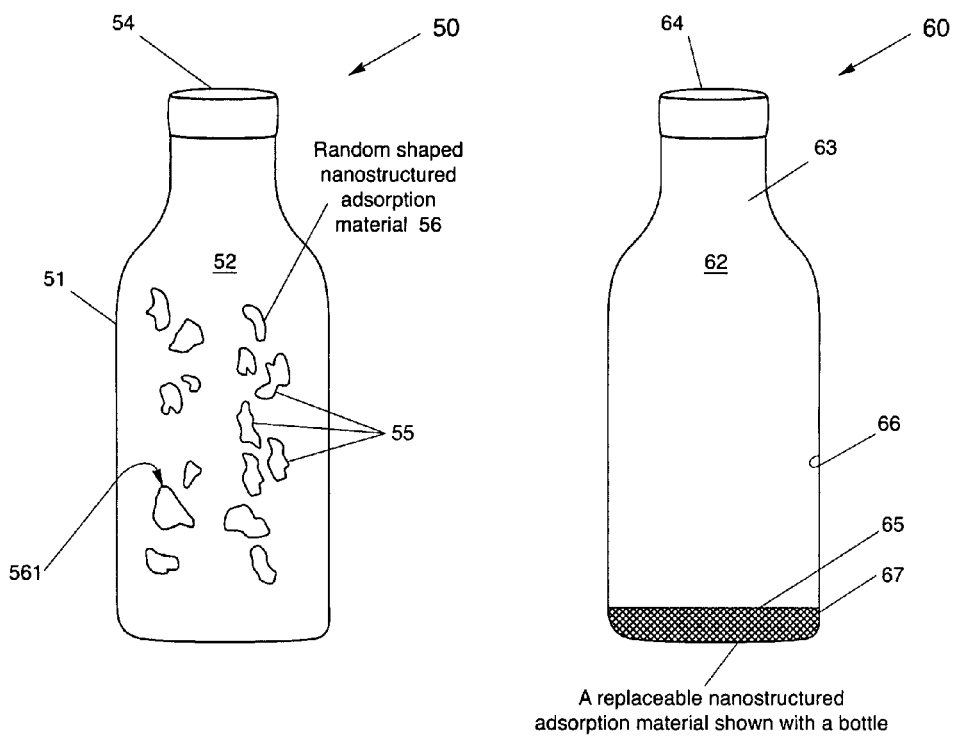
FIG. 5 illustrates a longitudinal section view of a system for removing contaminants from fluid in accordance with a further embodiment of the present invention.
FIG. 6 illustrates a longitudinal section view of another system for removing contaminants from fluid in accordance with one embodiment of the present invention.

In FIG. 5, there is illustrated another system 50 for purification of a fluid by removing contaminants, such as microorganisms, organic, inorganic and particulate matter from the fluid, in accordance with one embodiment of the present invention. The system 50, similar to the previously disclosed systems, may include a receptacle 51 having a chamber 52 for accommodating a volume of fluid, and an opening 53 through which a volume of fluid may be introduced into the chamber 52. A cover 54 may be provided across the opening 53 to prevent spillage of fluid from within the chamber 52.

The system 50 may also include a porous matrix 55 positioned within the chamber 52 for retaining, trapping, and thus removal of contaminants from the fluid. The porous matrix 55, made from a nanostructured adsorption material, and in accordance with this particular embodiment of the present invention, may be provided as a loose mass of macro particles 56 that can freely move within the fluid in chamber 52. Each of the particles 56 may include a contact surface 561 and an impermeable core (not shown), so that fluid may be prevented from flowing through the particles 56. The particles 56, in one embodiment, may be uniform in size and shape, or as illustrated, vary in size and shape. It should be appreciated that the particles 56 may be of a size and shape that would facilitate their removal from or placement within the chamber 52 through opening 53 for replacement purposes.

In another embodiment, referring now to FIG. 6, a system 60 is provided for purification of fluid by removing contaminants, such as microorganisms, organic, inorganic and particulate matter from the fluid. The system 60, as with the previously disclosed systems, may include a receptacle 61 having a chamber 62 for accommodating a volume of fluid, and an opening 63 through which a volume of fluid may be introduced into the chamber 62. A cover 64 may be provided across the opening 63 to prevent spillage of fluid from within the chamber 62.

The system 60 may also include a porous matrix 65, made from a nanostructured adsorption material, that is positioned within the chamber 52 for retaining, trapping, and thus removal of contaminants from the fluid. The porous matrix 65, in accordance with one embodiment of the present invention, may be placed circumferentially about walls 66 at an end 67 of the chamber 62 opposite the opening 63. In addition, porous matrix 65 may be designed to be sufficiently flexible and pliable to permit its removal from and placement within the chamber 62 through opening 63.

In an alternate embodiment, receptacle 61 may be provided with a removable end 67 about which porous matrix 65 may be circumferentially situated. In this manner, should the porous matrix 65 needs to be exchanged, the end 67 may be removed from receptacle 61 and disposed along with matrix 65, and a new end 67 with new porous matrix 65 may be reattached to receptacle 61. To permit removal from the receptacle 61, the end 67 and the receptacle 61 may be provided with threaded engagement. Alternatively, other engagement mechanisms known in the art, for example, snap-fit etc., may be used, so long as such engagement can prevent leakage of fluid from within the chamber 62, while permitting easy removal of end 67 from the receptacle 61.

Figure 7:
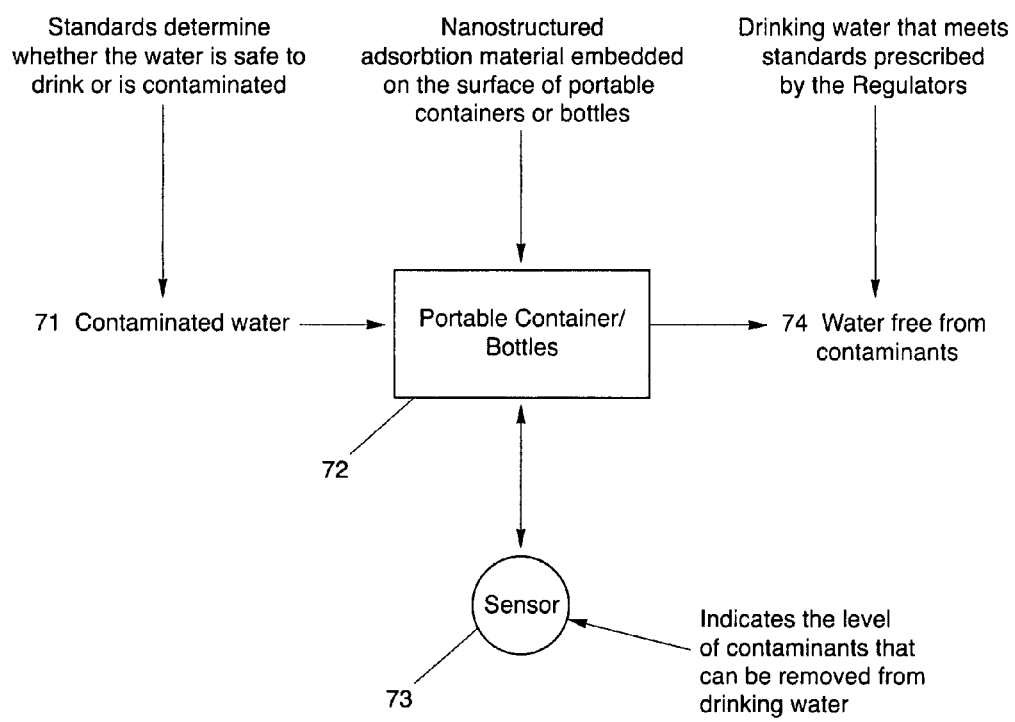
FIG. 7 illustrates schematically the process for removing contaminants from fluid in accordance with one embodiment of the present invention.

Referring now to FIG. 7, the system of the present invention may be used to purify fluid by removing particulates and/or contaminants from the fluid, such as water, when the levels of particulates and/or contaminants exceed the prescribed limits for fluid that is intended for human consumption. The limits of contaminants in the drinking fluids may be prescribed by the regulators. In operation, fluid 71 that may include particulates and/or contaminants may be initially be introduced into the chamber of receptacle 72. Once introduced within the receptacle 72, the fluid along with the molecules of contaminants therein, when come into contact with the porous matrix having the nanostructured adsorption material (e.g., flowing against or across the contact surface of the porous matrix), may be directed into the pores of the nanostructured adsorption material, wherein the molecules of contaminants may be trapped. It should be noted that the movement of fluid within the receptacle caused by or due to, for instance, shaking or moving of the receptacle should be sufficient to direct the flow of contaminants into the pores. If the situation is such that there is no movement of fluid within the receptacle, the contaminants may still be removed by slow molecular displacement or diffusion of molecules into the porous matrix within the receptacle.

Since the phenomenon occurs at a molecular level, the particulates and/or contaminants typically cannot be released from the pores within which they are trapped without enormous pressure or the application of heat at elevated levels. As the particulates and/or contaminants enter and become trapped within the pores, the weight of nanostructured adsorption material can increase to a measurable difference. Such an increase can be detected and displayed, for example, by a sensor, to indicate, for instance, the levels of contaminants removed from the fluid.

Accordingly, still referring to FIG. 7, a sensor 73 may be coupled to the receptacle 72, such that the sensor 73 may be in communication with a porous matrix within the receptacle in order to display the levels of contaminants removed from the fluid. Sensor 73 can be any sensor which can detect a pressure, weight or heat differential between a porous matrix at time $t_o$ and the same porous matrix at time $t_n$, subsequent to exposure of the porous matrix to the fluid. In one embodiment, the sensor 73 may include pressure detector sufficiently thin (e.g., thin layer wired mesh or sheet), so as to be capable of being embedded within the nanostructured adsorption material of the porous matrix, and a display in communication with the detector. The pressure detector can act to transform the pressure differential between $t_o$ and $t_n$ into electrical signals that can subsequently be process and shown on the display as the amount of particulates or contaminants in the porous matrix or the amount of contaminant removed.

The sensor 73 may alternatively employ a weight sensor. It is noted that if at $t_o$ the weight of the porous matrix is x milligram, then at $t_n$, for instance, 15 seconds, when the nanostructured material of the porous matrix has had a chance to adsorb the particulates and/or contaminants, the weight of nanostructured adsorption material will be x+y, with y being the weight of contaminants that has been removed from the fluid. The weight increase due to the adsorption of the contaminants can be transformed to electrical signals, which can subsequently be displayed as information on a scale in terms of percentage of contaminants removed from the fluid.

The sensor 73 may also employ a heat sensor. If, for instance, at $t_o$ the temperature of the porous matrix is x degrees, then at $t_n$, for instance, 15 seconds, when the nanostructured material of the porous matrix has had a chance to adsorb the particulates and/or contaminants, the heat generated in the nanostructured adsorption material will be x+y, with y being the temperature increase due to the adsorption of contaminants in the nanostructured material. This temperature increase can be transformed to electrical signals, which can subsequently be displayed as information on a scale in terms of percentage of contaminants removed from the fluid.

Whether using the pressure, weight and/or heat detector, when the nanostructured adsorption material approaches about 90% its capacity level for trapping particulates and/or contaminants, the sensor 73, in one embodiment, can be designed to warn the user, for instance, by audio, visual, or other applicable indicators, that the porous matrix needs replacing or that the receptacle can no longer be used, if the receptacle is designed to be a disposable system.

The system of the present invention, accordingly, may be refilled over and over again with fluid to be treated. The system may be used successively to generate purified fluid meeting standards or limits prescribed for human consumption, until the nanostructured adsorption material of the porous matrix approaches its exhaustive capacity for trapping and retaining particles therein, i.e., having entrapped and retained therein particulates and/or contaminants at about 90% of its capacity.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A system for purification of fluid, the system comprising:
   a receptacle;
   a chamber situated within the receptacle and into which a volume of fluid to be treated may be placed; and
   a porous matrix, positioned within the chamber, having a plurality of nanoscaled pores dispersed therein, such that fluid having particulates and/or contaminants flowing across one surface of the matrix flows back out along the same surface of the matrix substantially without the particulates and contaminants;
   wherein the nanoscaled pores of the porous matrix are dispersed between a fluid contact surface across which fluid may flow and a substantially fluid impermeable surface, such that fluid flowing across the contact surface into the pores of the matrix flows back out along the contact surface.

2. A system as set forth in claim 1, wherein the matrix is embedded within walls of the chamber with the surface across which fluid flows exposed to the fluid within the chamber.

3. A system as set forth in claim 1, wherein the porous matrix is adhered to the chambers with the surface across which fluid flows exposed to the fluid within the chamber.

4. A system as set forth in claim 1, wherein the porous matrix comprises a loose mass macro particles within the chamber, the macro particles having a fluid impermeable core.

5. A system as set forth in claim 1, wherein the porous matrix comprises a substantially cylindrical tube having a fluid impermeable interior surface.

6. A system as set forth in claim 1, wherein the porous matrix is adhered to the chamber walls at a bottom end of the chamber so that the surface across which fluid flows is exposed to the fluid within the chamber.

7. A system as set forth in claim 1, further including a sensor for detecting the amount of particulates removed from the fluid.

8. A system as set forth in claim 1, further including a sensor for warning the user when the porous matrix approaches its capacity to trap and retain particulates therein.

9. A system as set forth in claim 8, wherein the sensor can display the amount of particulates removed from the fluid.

10. A porous matrix for purification of a fluid, the matrix comprising:
    a nanostructured adsorption body having a contact surface across which fluid may flow;
    a fluid impermeable layer positioned on a surface opposite the contact surface; and
    a plurality of nanoscaled pores interspersed between the contact surface and the fluid impermeable layer;
    wherein fluid having particulates and/or contaminants flowing across the contact surface into the pores subsequently flows back out along the contact surface substantially without the particulates and contaminants.

11. A porous matrix as set forth in claim 10, wherein the nanoscaled pores are arranged in distinct layers according to size range.

12. A porous matrix as set forth in claim 11, wherein the nanoscaled pores in each layer get successively smaller in size, moving from the layer immediately adjacent the contact surface to the layer immediately adjacent the fluid impermeable layer.

13. A porous matrix as set forth in claim 10 further including a content of silver or silver compound distributed within the pores to minimize microbial growth within the matrix.

14. A method for purification of a fluid, the method comprising:
    providing a receptacle having a chamber for accommodating fluid to be treated;
    placing, within the chamber, a porous matrix having a plurality of nanoscaled pores dispersed between a fluid contact surface and a fluid impermeable surface, such that fluid having particulates and/or contaminants flowing across the fluid contact surface of the matrix flows back out along the same fluid contact surface of the matrix substantially without the particulates and/or contaminants;
    introducing fluid to be purified into the chamber;
    facilitate fluid flow within the chamber so that the fluid flows across the fluid contact surface of the porous matrix and into the pores; and allowing the particles and/or contaminants in the fluid to be trapped within the pores.

15. A method as set forth in claim 14, further including determining the amount of particulates and/or contaminants removed from the fluid.

16. A method as set forth in claim 14, further including notifying the user when the porous matrix approaches its capacity for trapping and retaining particulates and/or contaminants therein.

17. A method as set forth in claim 14, further including replacing the porous matrix when the matrix approaches its capacity for trapping and retaining particulates and/or contaminants therein.

18. A method as set forth in claim 14, further disposing the receptacle along with the porous matrix when the matrix approaches its capacity for trapping and retaining particulates and/or contaminants therein.

19. A kit for use in removing particulates from a fluid, the kit comprising:
   a receptacle having a chamber for accommodating therein fluid to be treated; and
   a porous matrix for placement within the chamber of the receptacle, the matrix having a plurality of nanoscaled pores dispersed between a fluid contact surface and a fluid impermeable surface, such that fluid having particulates and/or contaminants flowing across the fluid contact surface of the matrix flows back out along the same fluid contact surface of the matrix substantially without the particulates and/or contaminants.

* * * * *